United States Patent [19]
Kudo

[11] Patent Number: 4,855,876
[45] Date of Patent: Aug. 8, 1989

[54] AUTOMOBILE LAMP ASSEMBLY

[75] Inventor: Tetsuya Kudo, Kawasaki, Japan

[73] Assignee: Stanley Electric Co., Ltd., Tokyo, Japan

[21] Appl. No.: 221,314

[22] Filed: Jul. 19, 1988

[30] Foreign Application Priority Data

Jul. 29, 1987 [JP] Japan .......................... 62-116502[U]

[51] Int. Cl.⁴ .............................................. B60Q 1/04
[52] U.S. Cl. ...................................... 362/61; 362/267; 362/429; 362/285; 362/457
[58] Field of Search ................... 362/61, 80, 429, 267, 362/285, 287, 457

[56] References Cited

U.S. PATENT DOCUMENTS

| | | | |
|---|---|---|---|
| 1,972,056 | 8/1934 | Suaf | 362/429 |
| 4,569,005 | 2/1986 | Bergin et al. | 362/267 |
| 4,569,006 | 2/1986 | Bergin et al. | 362/267 |
| 4,623,958 | 11/1986 | Van der Linde et al. | 362/267 |
| 4,719,543 | 1/1988 | Colicandris et al. | 362/267 |

FOREIGN PATENT DOCUMENTS

| | | | |
|---|---|---|---|
| 2835560 | 2/1980 | Fed. Rep. of Germany | 362/61 |

*Primary Examiner*—Ira S. Lazarus
*Assistant Examiner*—Sue Hagarman
*Attorney, Agent, or Firm*—Frishauf, Holtz, Goodman & Woodward

[57] ABSTRACT

An automobile lamp assembly of a fixed focus type wherein the assembly has a socket cap, a flange and a socket all integrally formed, and a lamp is fixedly mounted on the socket cap. The assembly has at least three relatively thin tongues formed on the socket cap, and corresponding rectangular holes formed in the flange. The rectangular holes have a size to allow a respective tongue to pass therethrough. After adjusting a focus of the lamp with the tongues inserted into the holes, the tongues are spot welded to the main body of the socket.

12 Claims, 1 Drawing Sheet

AUTOMOBILE LAMP ASSEMBLY

BACKGROUND OF THE INVENTION

1. Field of the Invention

The present invention relates to an automobile lamp assembly of a fixed focus type having a socket whose flange is integrally formed therewith.

2. Description of the Related Art

A conventional automobile lamp assembly has been constructed as shown in FIGS. 4 and 5. Namely, a flange 11A integrally formed with a socket 11 is locally cut and folded down toward a socket cap 12 side to form tongues 13 which are spot welded on the the socket cap 12, thereby forming an integral assembly of the socket cap 12 and the socket 11. A lamp 14 is mounted on the socket cap 12 for electrical connection to terminals 11C through the interior of a socket main body 11B.

With the structure of the lamp assembly as above, however, the size of the tongue 13 is limited since it is made of the material forming the flange 13. Therefore, this structure is not satisfactory for a lamp assembly having a small size flange. Further, it is common that the flange 11A is made relatively thick so as to ensure mechanical strength thereof. Thus, there arises a problem that a thick tongue is not suitable for welding.

SUMMARY OF THE INVENTION

It is therefore an object of the present invention to provide an automobile lamp assembly which is suitable even for a lamp assembly having a small size flange and suitable for welding.

According to this invention, in an automobile lamp assembly of a fixed focus type wherein the assembly includes a socket cap, a flange and a socket all integrally formed, and a lamp fixedly mounted on the socket cap, an improvement is that at least three tongues are provided on the socket cap whose material is relatively thin, holes having a size to allow respective tongues to pass therethrough are formed in the flange, and after adjusting a focus of the lamp with the tongues inserted into the holes of the flange, the tongues are spot welded on the main body of the socket.

Since the tongues are formed using a relatively thin material, the welding of the tongues onto the socket main body is easy. Further, since the flange is formed only with the tongue receiving holes therein, a flange with a small height is applicable to the integral lamp assembly of the type to which the invention pertains.

DETAILED DESCRIPTION OF THE PREFERRED EMBODIMENT

An embodiment of the present invention will be described with reference to the accompanying drawings.

Figure 1:
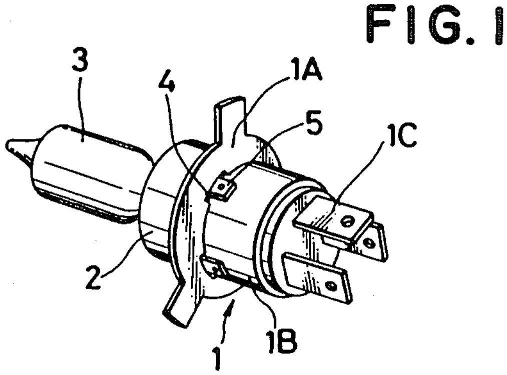
FIG. 1 is a perspective view showing an embodiment of an automobile lamp assembly according to the present invention.
Figure 2:
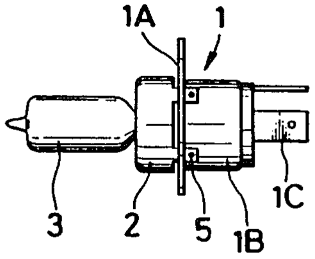
FIG. 2 is a side elevational view of the embodiment shown in FIG. 1.
Figure 3:
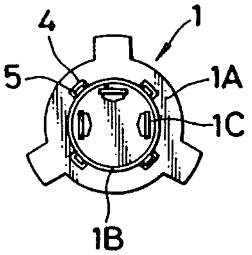
FIG. 3 is a bottom view of the embodiment shown in FIG. 1.
Figure 4:
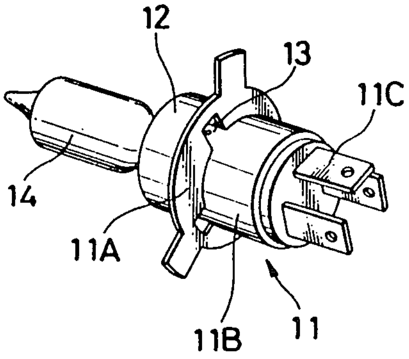
FIG. 4 (PRIOR ART)
FIGS. 4 and 5 are a perspective view and a side elevational view showing a conventional automobile lamp assembly, respectively.
Figure 5:
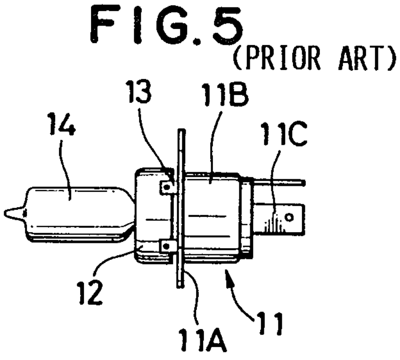
FIG. 5 (PRIOR ART)

FIGS. 1 to 3 show a preferred embodiment of an automobile lamp assembly of this invention. Reference numeral 1 represents a socket having a flange 1A formed integrally therewith, both being formed of the same material and having a relatively small thickness. Reference numeral 2 represents a socket cap on which a lamp 3 is fixedly mounted. The socket 1 includes the flange 1A, a main body 1B and terminals 1C. The lamp 3 is electrically connected to the terminals 1C through the interior of the lamp main body 1B. The flange 1A is formed with plural (e.g., four) rectangular holes 4, whereas the socket cap 2 is formed with a corresponding plurality (e.g., four) of tongues 5 which are preferably made of the same material and small thickness as those of the socket cap 2 and have a size to allow passage thereof through the holes 4. The tongues 5 project from the end of socket cap 2 and are inserted into the holes 4 formed in the flange 1A, and are then spot welded to the socket main body 1B to thereby form an integral assembly of the socket 1 and the socket cap 2. The spot welding is performed after the focus of the lamp 3 has been adjusted.

As appreciated from the above description, only the rectangular holes 4 are formed in the flange 1A integrally formed with the socket, whereas the welding tongues 5 of a small thickness are formed on the socket cap 2. Consequently, by inserting the tongues 5 into the rectangular holes 4 and slidably coupling them onto the main body 1B of the socket 1, a focus adjustment of the lamp 3 can be performed. Thereafter, the tongues 5 are spot welded to the socket main body 1B to form an automobile lamp assembly of a fixed focus type having a flange 1A, integrally formed with the socket. At least three tongues 5 and corresponding holes 4 should be used, but four tongues 5 and corresponding holes 4 are preferred.

According to the present invention, the tongues for welding are formed on the socket cap and the rectangular holes are formed in the flange to the tongues to pass therethrough. The tongues are then spot welded to the main body of the socket. Therefore, if the rectangular holes formed in the flange are sized to allow the tongues to pass through the holes, the lamp assembly of this invention is applicable even to an assembly whose flange is small in height. Further, the material of the socket cap is usually thinner than that of the socket and the tongues are made of the same thin material, so that the tongues are suitable for welding.

I claim:

1. An automobile lamp assembly of a fixed focus type, comprising:

- a socket having a main body portion with an outer surface;
- a flange coupled to said socket;
- a socket cap adapted to be mounted to said socket;
- a lamp fixedly mounted on said socket cap;
- at least three thin, substantially flat tongues provided on and projecting from said socket cap, said tongues being sufficiently thin to be spot welded;
- at least three tongue-receiving holes in said flange, said tongue-receiving holes having a size to allow respective ones of said thin tongues to pass therethrough when said socket cap is mounted to said socket and said tongue-receiving holes being arranged such that said thin tongues are adjacent said main body portion of said socket and are slidably guided along said main body portion in face-to-face confronting relationship with said outer surface of said main body portion after passing through said tongue-receiving holes; and said tongues being spot welded to said main body portion of said socket after said socket cap is moved relative to said socket for adjusting a focus of said lamp with said tongues inserted through said tongue-receiving holes, thereby forming a single unitary structure wherein said socket cap, flange and socket are all integrally and fixedly connected together.

2. The lamp assembly of claim 1, wherein said tongues are made of a thinner material than said flange.

3. The lamp assembly of claim 2, wherein said socket cap has substantially the same thickness as said thin tongues which project therefrom.

4. The lamp assembly of claim 3, wherein said thin tongues project from an end edge of said socket cap.

5. The lamp assembly of claim 3, wherein said socket cap is made of a material which is thinner than the material of said flange and said socket.

6. The lamp assembly of claim 1, wherein said flange is integrally connected with said socket.

7. The lamp assembly of claim 1, comprising at least four of said thin tongues and at least four of said tongue-receiving holes for respectively receiving said tongues therein.

8. The lamp assembly of claim 7, wherein said tongue-receiving holes in said flange are substantially rectangular holes.

9. The lamp assembly of claim 1, wherein said tongue-receiving holes in said flange are substantially rectangular holes.

10. The lamp assembly of claim 1, wherein said thin tongues have substantially rectangular cross-sections, and wherein said tongue-receiving holes in said flange are substantially rectangular holes for receiving said tongues, respectively, therein.

11. The lamp assembly of claim 1, wherein said thin tongues are substantially planar.

12. The lamp assembly of claim 1, wherein said main body portion of said socket is substantially cylindrical, and said thin tongues are slidable relative the outer cylindrical surface thereof, and are spot welded to said outer cylindrical surface.

* * * * *